Nov. 30, 1965 U. F. GIANOLA 3,221,313

MAGNETIC MEMORY CIRCUITS

Filed April 13, 1962 3 Sheets-Sheet 1

INVENTOR
U. F. GIANOLA
BY John F. Powell
ATTORNEY

Nov. 30, 1965 U. F. GIANOLA 3,221,313

MAGNETIC MEMORY CIRCUITS

Filed April 13, 1962 3 Sheets-Sheet 2

INVENTOR
U. F. GIANOLA
BY John F. Powell
ATTORNEY

Nov. 30, 1965 U. F. GIANOLA 3,221,313

MAGNETIC MEMORY CIRCUITS

Filed April 13, 1962 3 Sheets-Sheet 3

INVENTOR
U. F. GIANOLA
BY John F. Powell
ATTORNEY

United States Patent Office
3,221,313
Patented Nov. 30, 1965

3,221,313
MAGNETIC MEMORY CIRCUITS

Umberto F. Gianola, Florham Park, N.J., assignor to Bell Telephone Laboratories, Incorporated, New York, N.Y., a corporation of New York Filed Apr. 13, 1962, Ser. No. 187,425
4 Claims. (Cl. 340—174)

This invention relates to information storage arrangements and more particularly to such arrangements in which information is stored in the form of particular patterns of magnetic elements.

Magnetic memory circuits, in which specific informaton bits are stored in a coordinate array of magnetic elements such as toroidal magnetic cores, multiapertured magnetic elements, and the like, are well known in the information handling art. Another magnetic element which has proved highly advantageous for the multiple storage of information bits is the magnetic wire memory element having a helical flux component associated therewith. The flux component has substantially rectangular hysteresis characteristics and may be formed, for example, by helically winding a magnetic tape around a conductor. Such a memory element and an illustrative memory array comprised thereof is described, for example, in the copending application of A. H. Bobeck, Serial No. 675,522, filed August 1, 1957, and now Patent No. 3,083,353 issued March 26, 1963. In magnetic memory arrangements generally, an information bit is stored in an information address in the form of a representative condition of remanent magnetization of the storage element assigned as the address. In a magnetic wire memory element of the character referred to hereinbefore, discrete information addresses are measured off at segments of its length by energizing solenoids inductively coupled thereto at predetermined intervals. An information bit is then stored in an address by a particular representative remanent magnetization in the helical magnetic components within the wire segment.

In another information storage arrangement, magnetic wire memory elements also play an advantageous role, but in this case as a means for interrogating information stored in a particular pattern of individual magnetic means. In one such illustrative memory array, a paticular pattern of permanent magnets is affixed to a nonmagnetic card and positioned closely adjacent a planar array of parallel magnetic wire elements. Information may conveniently be stored in such an arrangement on a word-organized basis with the words being defined by interrogating windings in the form of flat strip word solenoids which enclose the parallel wire elements and are inductively coupled to them. The field of each of the permanent magnets is sufficient to saturate magnetically an adjacent corresponding bit address. An interrogating signal applied to one of the word solenoids then causes flux reversals to occur in only those bit addresses inductively coupled by the solenoid which do not have permanent magnets positioned adjacent them. Voltages induced by these flux reversals are detected and an entire binary word may thus be read out of the storage array by the application of an interrogating signal to a single one of the word solenoids. Such an information storage arrangement is described in the copending application of D. G. Clemons, Serial No. 137,281, filed September 11, 1961, and now Patent No. 3,133,271 issued May 12, 1964.

Although in the illustrative permanent magnet storage arrangement referred to in the immediately foregoing, magnetic wire memory elements are advantageously utilized as interrogating elements, it would be advantageous if interrogation could be achieved by means of elements more economical to fabricate and the design of which offers improved quality control. The fabrication of magnetic wire memory elements involves numerous steps such as, for example, the helical winding of the magnetic tape about the conductor and the encapsulation of a plurality of conductors and magnetic tapes in an insulating strap.

Accordingly, it is an object of this invention to provide an improved means for interrogating information bits stored in a pattern of permanent magnets.

It is another object of this invention to provide a memory array having information bits stored in a pattern of permanent magnets wherein a greater storage density may be obtained than has heretofore been realized in such arrays.

It is a further object of this invention to provide a memory array having information bits stored in a pattern of permanent magnets wherein a weaker field intensity of the magnets is permitted than heretofore allowed in such arrays.

It is yet another object of this invention to ease the restraints on registration between information representative permanent magnets and associated interrogating means.

Yet another object of this invention is the realization of a new and improved memory matrix.

The above and other objects of this invention are realized in one specific illustrative embodiment thereof comprising a memory array in which information stored in a pattern of permanent magnets is interrogated by means of flat strip word solenoids, copper sense conductors, and small magnetic switching elements contiguous to the magnets, rather than by means of word solenoids and magnetic wire memory elements. A plurality of parallel copper sense conductors are bonded to a nonconducting substrate board and a second plurality of parallel flat strip solenoids, making an angle of approximately 45° with the sense conductors, are also bonded to the substrate board. Bit addresses are defined at each intersection of the sense conductors and word solenoids. Magnetizable elements having a high coercive force and substantially rectangular hysteresis characteristics are affixed to an electrically conducting nonmagnetic removable card positioned in proximity to the solenoids and sense conductors, the elements being associated with respective ones of the bit addresses. Low coercive force magnetic switching elements are also affixed to the card and are contiguous to respective ones of the high coercive force elements. Information values are stored in the array by driving particular ones of the high coercive force elements to one of their two conditions of magnetic remanence. The elements so magnetized prevent the switching of their associated low coercive force elements by an external drive field. Thus, a drive signal applied to a particular word solenoid causes flux reversals to occur in only those switching elements associated with the particular solenoid which is not contiguous to magnetized ones of the high coercive force elements. The flux reversals in these switching elements induce signals in their associated sense conductors which are indicative of the information values stored in the high coercive force elements associated with the particular word solenoid.

By positioning the sense conductors and word solenoids such that they make an angle of approximately 45°, coupling between a switching element and both its associated word solenoid and its associated sense conductor is achieved. Assuming no anisotropy in the switching elements, a drive signal applied to a word solenoid establishes magnetic flux lines in the switching elements which make an angle of 45° with the sense conductors. Any reversal of these flux lines will therefore induce output signals in the sense conductors. With the word solenoids and sense conductors at 45° to each other there is some direct coupling between the solenoids and sense conductors. However, this direct coupling is negligibly small since the flux capacity of the switching elements is much greater than the air flux linkage between the word solenoids and sense conductors.

Additionally, there is little coupling between a sense conductor and portions of an adjacent switching element that lie outside the boundary formed by a rectangular section of its associated word solenoid diagonally crossed by its associated sense conductors. The switching element may therefore be made oversize with little change in linkages, thereby easing the constraints placed upon the registration of the elements on the removable cards with respect to the sense conductors and word solenoids of the substrate board. Furthermore, there is no problem of registration of a high coercive force element with its associated switching element since both are fixed relative to each other on the removable card itself.

Since a switching element and its associated permanent magnet are contiguous, the strength of the magnet may be minimized so that there is less interaction between a switching element and neighboring magnets than in previous arrangements thereby enabling a greater storage density to be achieved.

In another illustrative embodiment the sense conductors and word solenoids may advantageously be positioned at right angles to each other on the substrate board with coupling between the switching elements and sense conductors being achieved by means of switching elements exhibiting anisotropy. Small rectangular switching elements ordinarily have a preferred direction of magnetization parallel to their longer edge. Therefore, in this embodiment, such switching elements are positioned with their longer edge at an angle of 45° with the sense conductors, thereby maintaining coupling between the sense conductors and switching elements. The orthogonality of the sense conductors and word solenoids in this embodiment eliminate the direct inductive coupling between the two discussed previously.

In a further embodiment, the high coercive force elements may be dispensed with altogether. The removable card then contains only an information representative particular pattern of low coercive force switching elements which need not have substantially rectangular hysteresis characteristics. In this embodiment particular information values are, in essence, permanently stored on the card since a change in the stored values requires a physical rearrangement of the switching elements affixed to the card.

Thus, according to one feature of this invention, information is nondestructively read out of a pattern of magnetized ones of a plurality of high coercive force magnetic elements affixed to a nonmagnetic card by the selective switching of low coercive force magnetic elements also affixed to said card.

According to another feature of this invention, information values stored in a memory matrix in the form of a particular pattern of permanent magnets are nondestructively interrogated by means of low coercive force magnetic switching elements and a plurality of sense conductors and word solenoids which cross each other nonorthogonally.

According to still another feature of this invention, information values stored in a memory matrix in the form of a particular pattern of permanent magnets are nondestructively interrogated by a means of orthogonally positioned sense conductors and word solenoids and low coercive force switching elements possessing a preferred direction of magnetization such that flux lines in the elements link both the sense conductors and word solenoids.

It is still another feature of this invention that a magnetic memory matrix is provided in which magnetic elements affixed to a nonmagnetic card comprise the only magnetic elements of the matrix.

The foregoing and other objects and features of this invention will be more clearly understood by a consideration of the following detailed description thereof when taken in conjunction with the foregoing drawing in which.

Figure 3:
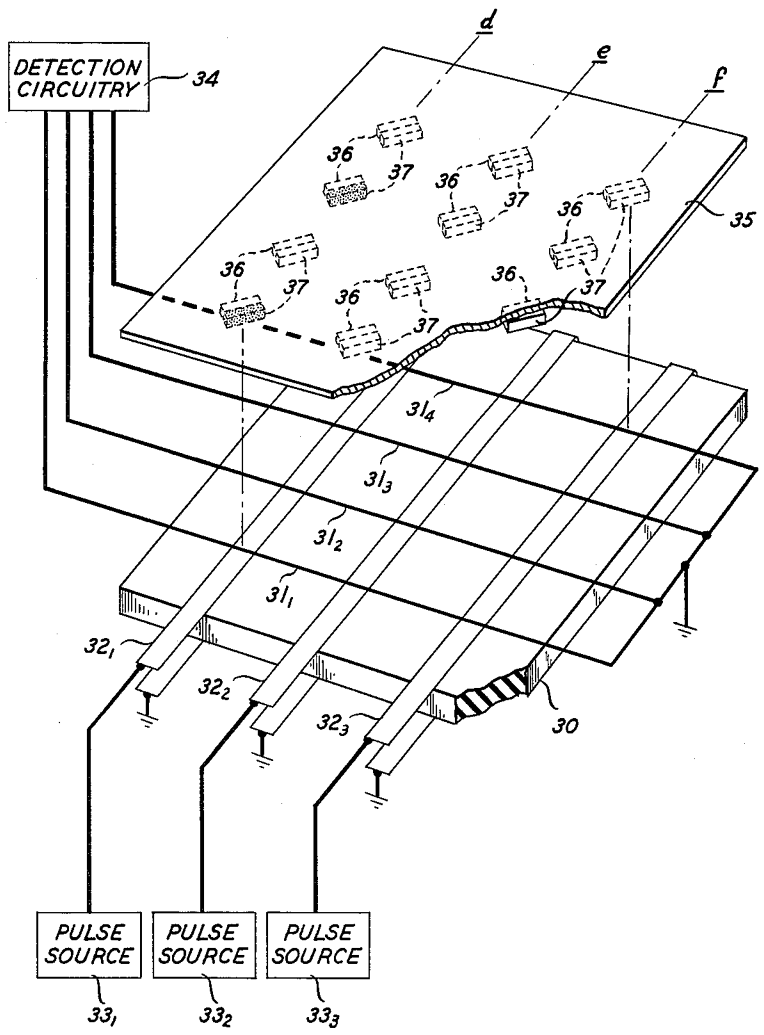
Figure 4:
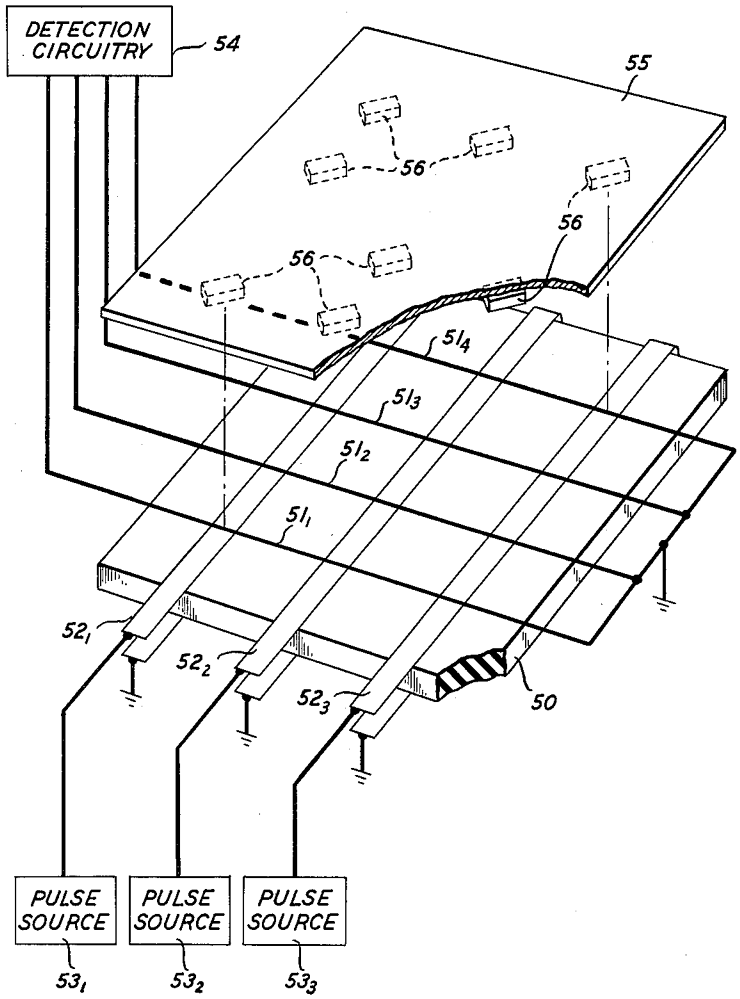

FIG. 3 depicts an illustrative single plane of another embodiment of a memory matrix according to the principles of this invention shown in exploded view, which embodiment utilizes low coercive force switching elements having a preferred direction of magnetization; and FIG. 4 depicts an illustrative single plane of another memory matrix also shown in exploded view in which information is stored in a pattern of low coercive force magnetic switching elements affixed to a nonmagnetic plate.

Figures 1, 2:
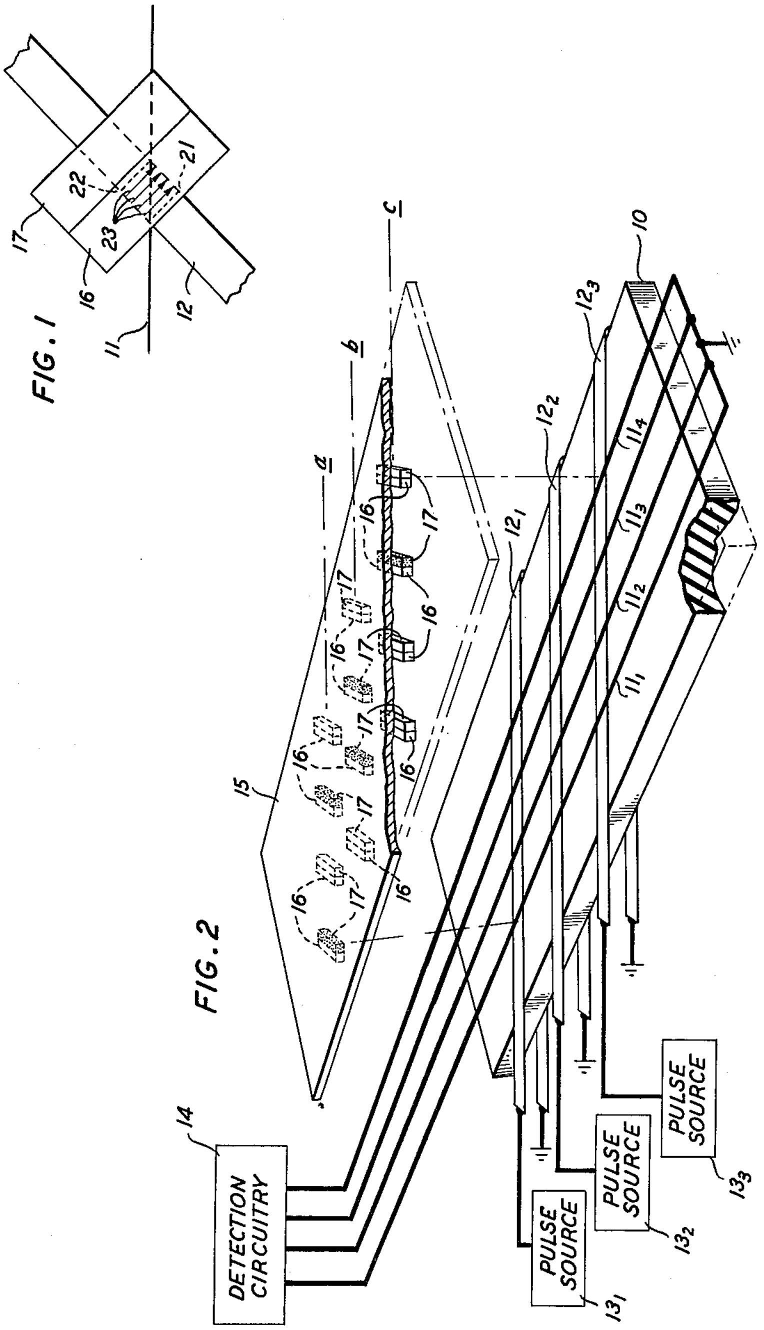
FIG. 1 depicts an illustrative, single bit address of one embodiment of a memory matrix according to the principles of this invention in which sense conductors and word solenoids cross each other nonorthogonally.
FIG. 2 depicts an illustrative single plane of a memory matrix according to this invention shown in exploded view, one bit address of which is depicted in FIG. 1.

FIG. 1 depicts a single bit address of a memory array according to this invention. A copper sense conductor 11 and a copper flat strip solenoid 12 are shown. The conductor 11 and solenoid 12 cross at an angle of approximately 45° and contiguous magnetic elements 16 and 17 are positioned in inductive proximity to this intersection. Element 16 has a low coercive force and is used to interrogate information stored in element 17 which has a high coercive force and a substantially rectangular hysteresis characteristic. For purposes of illustration only, elements 16 and 17 are placed side by side. However, advantageously, the elements may be superimposed, one on top of the other, to provide a more efficient magnetic coupling.

A binary information value is stored in the address by the magnetic condition of the storage element 17. Thus, a binary "0" may be considered to be stored in the address when the element 17 has been driven to either one of its conditions of magnetic remanence, thereby driving element 16 into saturation, and a binary "1" may be considered to be stored in the address when the element 17 remains essentially unmagnetized. The information so stored is interrogated by the application of an interrogating signal of either polarity to solenoid 12. When storage element 17 is magnetized, it prevents flux switching in switching element 16 responsive to the interrogating signal; a signal of one polarity being of insufficient magnitude to overcome the effect of element 17 and a signal of the opposite polarity merely driving element 16 further into saturation. When storage element 17 is not magnetized, however, the interrogating signal effects a flux excursion in element 16 thereby inducing a signal in sense conductor 11, the detection of which indicates the storage of a "1" in the bit address. Thus, the presence or absence of a signal on sense conductor 11 responsive to an interrogating signal on solenoid 12 indicates, respectively, the storage of a "1" or a "0" in the bit address.

Alternatively, a binary "0" and a binary "1" may be considered stored in the address when element 17 has been driven to one condition of remanent magnetization or to its opposite condition of remanent magnetization, respectively. The element 17 then drives the element 16 into one or the other condition of saturation. The information so stored is interrogated by the application of an interrogating signal to solenoid 12. The signal is determined to be of a polarity of magnitude such that the element 16 is merely driven further into saturation when a binary "0" is stored in the address but is switched to its opposite saturated condition when a binary "1" is stored in the address. The interrogating signal must be sufficient to overcome the inhibiting field of element 17 applied to element 16 when a binary "1" is stored in the address but insufficient to cause any switching in element 17 itself. Following interrogation the field of element 17 restores element 16 to its previous saturated condition when a "1" is stored in the address. This method of storage thus enables the field of element 17 to return element 16 to its previous magnetic condition after interrogation rather than requiring separate means for such restoration, such as a restoration signal applied to solenoid 12 of a polarity opposite to that of the interrogation signal. Restoration is necessary at all, however, only if the element 16 is of a material exhibiting remanence and the flux change between a remanent point and saturation is insufficient to induce a satisfactory output signal in sense conductor 11.

For illustrative purposes, only a portion of sense conductor 11 and solenoid 12 are shown in FIG. 1, the supporting means to which they are affixed and the supporting means to which the elements 16 and 17 are affixed are not shown, and associated circuitry is not shown. These elements are, however, depicted in FIG. 2.

During interrogation of the bit address of FIG. 1 when it is storing a "1," the magnetic flux effected in element 16 is in a direction orthogonal to solenoid 12, as shown by the arrows 23, the arrows 23 depicting flux effected in element 16 by a positive interrogating signal applied to the lower portion of solenoid 12 as viewed in FIG. 1. The dotted lines 21 and 22 are drawn perpendicular to the edges of solenoid 12 from the points where these edges intersect conductor 11. It is apparent that, of the magnetic flux within element 16 which changes responsive to the interrogating signal applied to solenoid 12, only that portion which is between lines 21 and 22 is coupled to sense conductor 11. This results since substantially all of the flux change which occurs in element 16 takes place in that part of the element directly over solenoid 12. Consequently, the element 16 may be made oversize thereby diminishing substantially the problem of properly registering a switching element 16 with its sense conductor 11 without changing the amount of flux linking the sense conductor 11. The problem of registering the switching element 16 with its associated storage element 17 is eliminated since these elements are affixed to each other on the card.

The sense conductor 11 and interrogating solenoid 12 of FIG. 1 are shown crossing at an angle of approximately 45°. The switching element 16 is shown positioned with its longer edge at right angles to the solenoid 12. An interrogating signal applied to solenoid 12 then tends to effect flux change in element 16 in a direction parallel to the longer edge of the element and at an angle of 45° to sense conductor 11. Flux will be switched in the element 16 in this manner if element 16 is isotropic or if it has a preferred direction of magnetization at right angles to solenoid 12. It is readily apparent that the 45° angle between sense conductor 11 and solenoid 12 is not critical and that it is only necessary that conductor 11 and solenoid 12 cross at an acute angle such that flux changes effected in element 16 by interrogating signals on solenoid 12 are coupled to sense conductor 11 to an extent sufficient to produce distinct output signals on conductor 11.

A single plane of a memory array according to this invention is shown in FIG. 2. Each bit address of the array is similar to that depicted in FIG. 1. A nonconducting substrate board 10 has affixed thereto a plurality of parallel copper sense conductors $11_1$ through $11_4$. The board 10 may be of either a magnetic or a nonmagnetic material. A plurality of parallel flat strip copper word solenoids $12_1$ through $12_3$ are also affixed to board 10 beneath the conductors 11 and make an angle of approximately 45° with the conductors 11 at their intersections. The solenoids 12 are insulated from the conductors 11; this may be achieved, for example, by wrapping insulating tape about the conductors 11 or by using enamelled wire for conductors 11. The solenoids $12_1$ through $12_3$ are connected between pulse source $13_1$ through $13_3$, respectively, and ground potential. Each of the sense conductors 11 is connected between detection circuitry 14 and ground potential. The pulse sources 13 are shown in block diagram form only and may comprise any well known circuits capable of selectively providing pulses of the character described hereinafter. Similarly, the detection circuitry 14 is shown in block diagram form only and may comprise well known threshold discrimination circuitry capable of detecting signals induced in the sense conductors 11.

A nonmagnetic card 15 is positioned in proximity to the board 10. The card 15 may be made electrically conducting to achieve advantages discussed in the copending application of D. G. Clemons referred to hereinbefore. A pattern of low coercive force magnetic switching elements 16 and high coercive force rectangular hysteresis loop magnetic storage elements 17 are affixed to the side of the card 15 facing the board 10 and are positioned opposite each intersection of the solenoids 12 and sense conductors 11. The elements 16 and 17 are positioned in three rows *a*, *b*, and *c* associated respectively with the solenoids $12_1$, $12_2$, and $12_3$. Particular information values are stored in the array by driving particular ones of the high coercive force elements 17 to either of their states of magnetic remanence while the remaining ones of the elements 17 are substantially unmagnetized. Alternatively, the elements 17 may be driven to their opposite states of remanent magnetization for the storage of information as discussed previously in connection with FIG. 1. The elements 17 in one of their remanent states are indicated in FIG. 2 by the shading of these elements and will be assumed to store binary "0's." The rows *a*, *b*, and *c*, therefore, store the illustrative binary words 0101, 1001, and 1101, respectively. The elements may be driven to their remanent states by any well known means such as conventional magnetic heads.

For illustrative purposes FIG. 2 is shown in exploded view with card 15 shown removed from board 10 by a gerater distance than actually would be the case. Advantageously, they are positioned such that the elements 16 and 17 are in close proximity to their associated sense conductors 11 such that lines of magnetic flux in the elements 16 link their associated sense conductors 11. Bearing in mind the foregoing organization, a description of the operation of this circuit will now be set forth.

A positive interrogating current pulse applied to one of the word solenoids 12 from its associated pulse source 13 effects flux excursions in particular ones of the low coercive force switching elements 16 associated with that solenoid. As discussed in connection with FIG. 1, the interrogating signal may be of either polarity. The particular elements thus switched are determined by the magnetic condition of their associated storage elements 17. The flux changes effected in these elements 16 induce output signals in particular ones of the sense conductors 11, which signals are indicative of information values stored in those high coercive force storage elements 17 associated with the selected word solenoid 12. The interrogating signal applied to the selected solenoid 12 is of a magnitude which is determined to be sufficient to cause flux excursions in those low coercive force elements 16 adjacent unmagnetized ones of the storage elements 17. The magnitude of the interrogating signals is determined to be insufficient, however, to overcome the effect of the elements 17 and thereby cause flux excursions in those ones of the low coercive force elements 16 adjacent magnetized ones of the elements 17. Thus, the application of an interrogating signal to a selected one of the solenoids 12 and the detection of signals consequently induced in the sense conductors 11 results in the interrogation of an entire binary word stored in the high coercive force elements 17 associated with the selected solenoid.

If the binary information word stored in the elements 17 of row *b* associated with solenoid $12_2$ is to be interrogated, for example, an interrogating signal from source $13_2$, which may be assumed to be of positive polarity, is applied to this solenoid. Of these elements 17, the ones associated with sense conductors $11_2$ and $11_3$ are in one of their states of remanent magnetization, as indicated by the shading of these elements, while the ones associated with sense conductors $11_1$ and $11_4$ are essentially unmagnetized, which magnetization states will be assumed to store the binary word 1001. The switching of the elements 16 associated with sense conductors $11_1$ and $11_4$ responsive to the interrogating signal induces output signals in conductors $11_1$ and $11_4$. The detection of these signals by circuitry 14 is thus indicative of the binary word 1001 stored in the elements 17 associated with solenoid $12_2$.

The storage elements 17 are of a high coercive force magnetic material having substantially rectangular hysteresis characteristics while the switching elements 16 are of a low coercive force magnetic material which must have a saturable but not necessarily rectangular hysteresis characteristics. Elements 16 associated with magnetized ones of the elements 17 are driven to saturation by these elements 17. The interrogating signals are chosen to be of insufficient magnitude to overcome the effect of magnetized ones of the elements 17 and thereby cause any flux excursions in their associated elements 16 and, a fortiori, are insufficient to cause any flux excursions in the magnetized elements 17 themselves. As described in the copending application of D. G. Clemons, referred to hereinbefore, interaction effects caused by fields from magnets associated with neighboring bit addresses may affect the output from a particular bit address. The present invention, by positioning the switching magnetic elements 16 contiguous to the information storing elements 17 and by arranging both of these elements close to the sense conductors 11, permits magnets of weaker magnetic strength to be used as the information storing elements 17 and therefore greatly reduces the interaction effects. Consequently, a substantially greater storage density may be obtained by increasing the number of magnetic elements 16 and 17 on the card 15, than was possible in previous configurations because of interaction effects.

The solenoids 12 and sense conductors 11 intersect on the board 10 at angles of approximately 45°. Although this is a convenient angle intersection for the embodiment shown in FIG. 2, it is only necessary that flux lines in a switching element 16 link both its associated solenoid 12 and its associated sense conductor 11. Since the solenoids 12 and sense conductors 11 are nonorthogonal, there is some direct coupling between them. However, signals induced in the sense conductors as a result of this direct coupling are negligibly small since the flux capacity of the elements 16 is chosen to be much greater than the air flux linkage between the solenoids 12 and conductors 11.

The use of copper sense conductors 11 rather than the magnetic wire memory elements, referred to hereinbefore, as the sensing elements of the memory array of FIG. 2 results in a memory array which is more easily fabricated and which permits of improved quality control than do arrays which utilize the aforesaid memory elements.

Another embodiment according to the principles of this invention, also shown in an exploded view, is depicted in FIG. 3. A nonconducting substrate board 30 has bonded thereto parallel sense conductors $31_1$ through $31_4$ and parallel word solenoids $32_1$ through $32_3$ orthogonal to conductors 31. The board 30 may be composed of either a magnetic or nonmagnetic material. The solenoids $32_1$ through $32_3$ are connected between pulse sources $33_1$ through $33_3$, respectively, and ground potential and the sense conductors 31 are connected between detection circuitry 34 and ground potential. A nonmagnetic card 35, which may advantageously be electrically conducting, is positioned in proximity to the board 30 and pairs of contiguous low coercive force switching elements 36 and high coercive force storage elements 37 are affixed to the side of card 35 facing board 30. The elements are positioned in rows *d*, *e*, and *f* associated respectively with solenoids $32_1$, $32_2$, and $32_3$. The conductors 31 and solenoids 32 are, in this embodiment, at right angles to each other and an information bit address is defined at each of their intersections. The pairs of elements 36 and 37 are positioned adjacent respective ones of these bit addresses. The switching elements 36 are rectangular in shape, are anisotropic, having a preferred direction of magnetization parallel with their longer edge, and each such element is positioned such that its longer edge is at approximately 45° to both its associated word solenoid 32 and its associated sense conductor 31. The pulse sources 33, shown in block diagram form, may comprise well known circuitry capable of providing current pulses of the character described hereinafter and circuitry 34, also shown in block diagram form, may comprise well known circuitry capable of detecting signals induced in sense conductors 31. An illustrative operation of the circuit of FIG. 3, which is very similar to that of the circuit of FIG. 2 will now be set forth.

If the binary word stored in the elements 37 of row *d*, associated with solenoid $32_1$, is to be interrogated, for example, an interrogating current pulse, which may be assumed to be of positive polarity, is applied to solenoid $32_1$ from pulse source $33_1$. Of the elements 37 associated with this solenoid, the ones also associated with sense conductors $31_1$ and $31_3$ have been previously set to one of their remanent magnetic conditions, representative of binary "0's," as indicated by the shading of these elements; while the ones also associated with conductors $31_2$ and $31_4$ remain substantially unmagnetized, representative of binary "1's." The elements 37 associated with sense conductors 31 and 33 may be driven to their remanent condition by any well known means such as conventional magnetic heads. The interrogating signal is of a magnitude sufficient to effect flux excursions in only those elements 36 paired with the unmagnetized ones of the elements 37. This flux change induces signals in the sense conductors $31_2$ and $31_4$ which are indicative of the binary word being interrogated.

By using elements 36 having a preferred direction of magnetization and aligning this preferred direction at an angle of approximately 45° with the solenoids 32 and sense conductors 31, interrogation may be achieved even though the solenoids 32 and conductors 31 are perpendicularly arranged. Interrogating signals applied to the solenoids 32 effect flux excursions in particular ones of the switching elements 36 and this switching occurs along the preferred direction of magnetization. Direct coupling between the solenoids 32 and sense conductors 31 is accordingly eliminated in this embodiment.

FIG. 4 depicts another embodiment of the present invention. As described hereinbefore, a nonconducting substrate board 50 has bonded thereto parallel word solenoids $52_1$ through $52_3$ and parallel sense conductors $51_1$ through $51_4$ arranged at right angles to the solenoids, the conductors being connected between ground potential and detection circuitry 54 and the solenoids $52_1$ through $52_3$ being connected beween ground potential and pulse sources $53_1$ through $53_3$, respectively. A nonmagnetic card 55 which may advantageously be electrically conducting, is positioned in proximity to the board 50. In this embodiment, however, rectangular low coercive force switching elements 56 alone are affixed to card 55 and are positioned adjacent only particular ones of the bit addresses defined by the intersections of the solenoids 52 and the sense conductors 51. Information is stored according to the particular pattern of switching elements 56 on the card 55, a binary "1" being stored in each address having an element 56 associated therewith. Thus, for example, the elements 56 at the crosspoints of solenoid $52_1$ and conductors $51_1$, $51_3$, and $51_4$ may be assumed to store the illustrative word 1011. The elements 56 also have a preferred direction of magnetization parallel with their longer edges and are positioned so that these longer edges are at approximately 45° to both the solenoids and sense conductors. Information is interrogated by the application of an interrogating signal, which may be assumed to be of positive polarity, to a selected one of the solenoids 52, flux excursions occur in those elements 56 associated with the selected solenoid, and signals are induced in those conductors 51 adjacent those elements. Thus, for example, if an interrogating signal is applied to solenoid $52_1$ flux changes occur in those elements 56 associated with that solenoid and output signals indicative of the binary word being interrogated are induced in sense conductors $51_1$, $51_3$, and $51_4$, with no output signal being induced in sense conductors $51_2$.

In the storage card 55 the information stored thereon is permanently stored since to change the information stored thereon requires a rearrangement of the switching elements 56. Information stored in the cards depicted in FIGS. 2 and 3, on the other hand, may be easily changed by changing the magnetic condition of the high coercive force storage elements affixed thereto.

What have been described are considered to be only illustrative embodiments according to the principles of this invention and it is to be understood that numerous other arrangements may be devised by one skilled in the art without departing from the spirit and scope thereof.

What is claimed is:

1. A memory cell comprising a pair of closely adjacent magnetic elements affixed to a first support means, a first element of said pair having substantially rectangular hysteresis characteristics, the second element of said pair having a coercive force substantially lower than that of said first element and having a longitudinal axis, a flat strip interrogating conductor and a sense conductor affixed to a second support means and intersecting thereon, said pair of magnetic elements positioned in close proximity to said intersection, said longitudinal axis being parallel to the plane of said intersecting interrogating conductor and sense conductor and to the flat surface of said interrogating conductor, said first element being in one of its remanent magnetic conditions for the storage of one binary value, said first element being essentially unmagnetized for the storage of the other binary value, means for applying an interrogating current signal to said interrogating conductor, said interrogating signal being of insufficient magnitude to cause flux excursions in said second element when said first element is in a remanent magnetic condition but of sufficient magnitude to cause flux excursions in said second element when said first element is essentially unmagnetized, said flux excursions occurring primarily in that portion of said second element crossed by said interrogating conductor, said interrogating conductor, sense conductor and second element being positioned relative to each other such that flux excursions in said second element induce signals in said sense conductor, and means for detecting signals induced in said sense conductor.

2. A memory cell according to claim 1 in which said first support means comprises a nonmagnetic card positioned in proximity to said sense conductor, said pair of magnetic elements being contiguous and affixed to said card on the side facing said sensing element.

3. A memory cell according to claim 2 in which said interrogating conductor and sense conductor intersect in an acute angle.

4. A memory cell according to claim 2 in which said second magnetic element has a preferred direction of magnetization, said interrogation conductor and sense conductor are substantially perpendicular and said second magnetic element is positioned on said card such that magnetic flux in said preferred direction links both said interrogating conductor and said sense conductor.

References Cited by the Examiner

UNITED STATES PATENTS

| | | | |
|---|---|---|---|
| 3,015,807 | 1/1962 | Pohm et al. | 340—174 |
| 3,027,548 | 3/1962 | Vaughan | 340—174 |
| 3,058,097 | 10/1962 | Poland | 340—174 |
| 3,060,411 | 10/1962 | Smith | 340—174 |
| 3,061,821 | 10/1962 | Gribble | 340—174 |
| 3,125,743 | 3/1964 | Pohm | 340—174 |
| 3,125,745 | 3/1964 | Oakland | 340—173 |
| 3,133,271 | 5/1964 | Clemons | 340—174 |

OTHER REFERENCES

Pages 54–555, April 1959—Publication I, Journal of Applied Physics, Duppl to vol. 30, No. 4.

Page 50, July 1960—Publication II, IBM Technical Disclosure Bulletin, vol. 3, No. 2.

IRVING L. SRAGOW, *Primary Examiner.*